United States Patent [19]

McConnell et al.

[11] 4,334,211
[45] Jun. 8, 1982

[54] SPEAKER GRILLE FOR STREAMLINED LIGHT BAR MOUNTED ON VEHICLE ROOF

[75] Inventors: Michael V. McConnell, Park Ridge; Paul D. Graham, Frankfort, both of Ill.

[73] Assignee: Federal Signal Corporation, Oak Brook, Ill.

[21] Appl. No.: 182,995

[22] Filed: Sep. 2, 1980

[51] Int. Cl.³ .............................................. B60Q 1/00
[52] U.S. Cl. ....................................... 340/88; 340/50; 340/84; 340/87; 181/143; 181/198; 296/1 S; 179/1 E; 116/147; 362/217
[58] Field of Search ............. 340/88, 50, 84, 87; 296/1 S; 362/35, 74, 217, 237, 362, 363, 72; 181/153, 198, 199, 224, 141, 143; 40/591, 592; 116/147; 179/1 E; 244/57; 52/660, 673, 675, 664, 27, 28

[56] References Cited

U.S. PATENT DOCUMENTS 3,789,358  1/1974  Ellis ..................................... 340/50
4,189,709  2/1980  Gosswiller ........................... 340/84

*Primary Examiner*—John W. Caldwell, Sr.
*Assistant Examiner*—Donnie L. Crosland
*Attorney, Agent, or Firm*—Charles F. Pigott, Jr.

[57] ABSTRACT

An improved speaker grille for incorporation in the housing of a light/siren assembly of a type which is mounted across the roof of a police car or other emergency vehicle, the improved grille being designed to significantly reduce the drag coefficient of the light/siren assembly due to the unique location of the grille openings.

8 Claims, 8 Drawing Figures

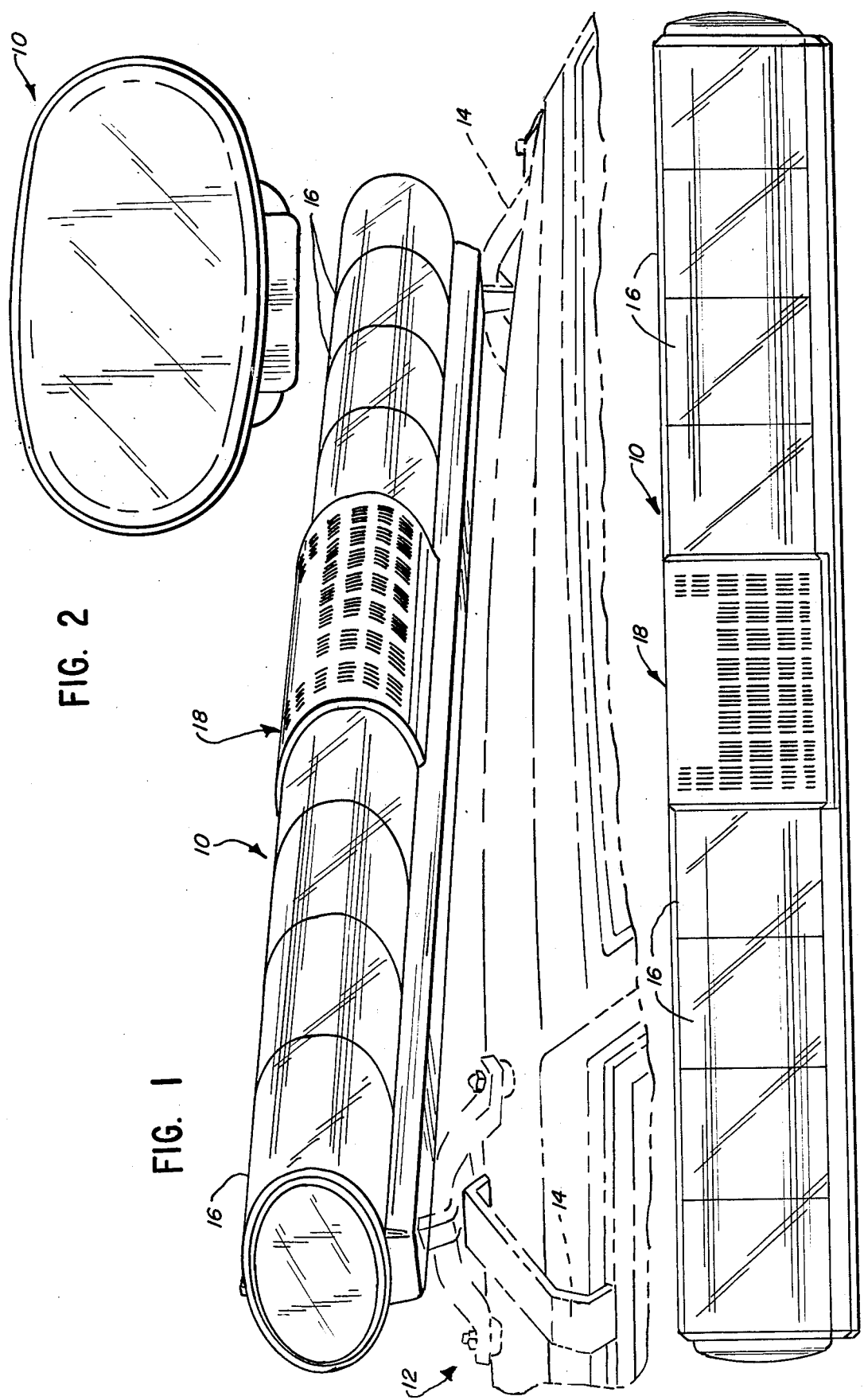

SPEAKER GRILLE FOR STREAMLINED LIGHT BAR MOUNTED ON VEHICLE ROOF

BRIEF SUMMARY OF THE INVENTION

The present invention relates to an improved speaker grille for incorporation in the housing of a combination light/siren assembly of a type which is mounted across the roof of a police car or other emergency vehicle. In particular, the improved speaker grille of the present invention is intended for use with various streamlined light/siren housings which have come into common use in recent years and are intended to reduce the drag coefficient and thereby increase the fuel efficiency of the vehicles on which they are mounted.

A known combination light/siren assembly for mounting across the roof of a police vehicle is disclosed in Gosswiller U.S. Pat. No. 4,189,709 which is assigned to the assignee of the present invention. Such an assembly includes a housing having a plurality of transparent panels, and a plurality of rotatable warning lights mounted in the housing in side-by-side relation. The elongated housing is mounted on a vehicle roof transversely relative to the length of the vehicle so that the housing extends across the major portion of the width of the vehicle roof.

Many known light/siren assemblies include a siren speaker housing which is customarily located midway between the two ends of the light/siren assembly, but may be mounted in an offset position closer to one end of the assembly. Such a speaker housing normally includes a front grille panel, often made of sheet metal, which panel is perforated with a large number of openings and is incorporated into the light/siren housing so that the speaker grille openings face forwardly and somewhat upwardly relative to the vehicle on which the light/siren assembly is mounted.

The housing disclosed in the above-mentioned U.S. Pat. No. 4,189,709 and other such housings introduced in recent years for mounting across the roof of a police or other emergency vehicle were designed with the objective of streamlining the housing and reducing the drag coefficient. Such designs have been successful, and significant reductions in drag coefficient and resultant increases in vehicle fuel efficiency have been obtained. However, our studies have now established that the grille openings normally provided in the forward and upper areas of a speaker grille commonly incorporated in a light/siren assembly tend to interfere with the desired laminar air flow over the light/siren housing as the vehicle travels forwardly. The result is that undesired turbulence is created in the upper forward area of such a speaker grille thereby increasing the drag coefficient significantly in spite of the streamlined shape of the housing member.

It is therefore an object of the present invention to provide an improved speaker grille for incorporation in the housing of a combination light/siren assembly for mounting across the roof of an emergency vehicle, which speaker grille will significantly reduce the drag coefficient of the light/siren housing.

A more specific object of our invention is to reduce the drag coefficient of a speaker grille as described above by locating the grille openings in a unique arrangement which reduces drag forces without significantly impairing the sound emitting characteristics of the speaker grille.

The foregoing and other objects and advantages of the invention will be apparent from the following description of a preferred embodiment, taken in conjunction with the accompanying drawings.

DESCRIPTION OF THE DRAWINGS

FIG. 1 is a perspective view of a combination light/siren assembly shown mounted across the roof of a police vehicle;

FIG. 2 is an end elevational view of the light/siren assembly of FIG. 1;

FIG. 3 is a front elevational view of the light/siren assembly of FIG. 1;

Figure 4:
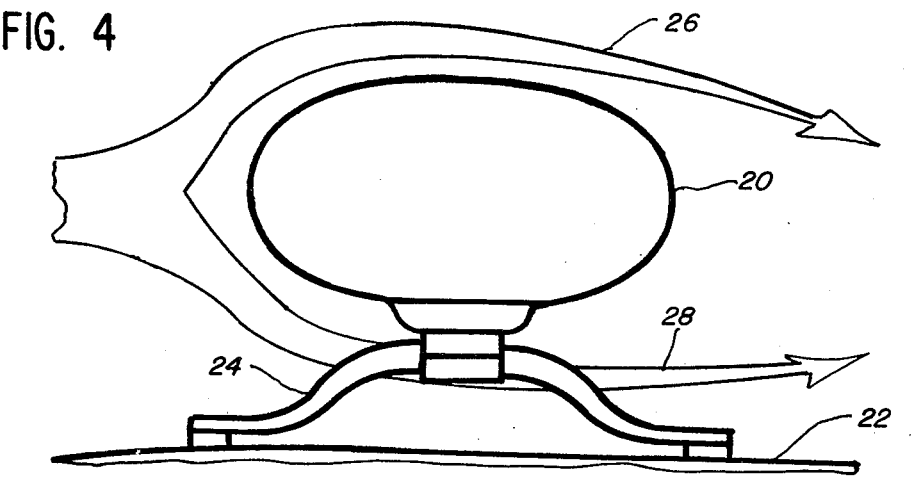
FIG. 4 is a schematic illustration of a desired air flow pattern above and below a light/siren housing mounted across the roof of a vehicle as the vehicle travels forwardly.

Now, in order to acquaint those skilled in the art with the manner of making and using our invention, we shall describe, in conjunction with the accompanying drawings, certain preferred embodiments of the invention.

DETAILED DESCRIPTION OF THE INVENTION

Referring now to the drawings, FIG. 1 shows a light/siren assembly 10 mounted across the roof of a police vehicle 12 by attachment members 14 which anchor the assembly to the vehicle roof. The light/siren assembly 10 includes a housing having a plurality of transparent panels 16, and a plurality of rotatable lights (not shown) are mounted within the housing and produce light flashes which are visible through the panels 16. The light/siren assembly 10 further includes a speaker grille 18 located at the central portion of the light/siren housing. A siren speaker (not shown) is located within the housing behind the speaker grille 18, the rotating lights being mounted on both sides of the speaker. The speaker grille 18 is constructed in a unique manner in accordance with the present invention, but the remainder of the light/siren assembly shown in FIG. 1 is known and is described in greater detail in the above-mentioned U.S. Pat. No. 4,189,709.

Many light/siren assemblies for mounting across the roof of a police vehicle include a housing which is generally box-shaped and has a substantially upright front housing wall which is not intended as an aerodynamic design. An assembly of the foregoing type which is still in common use today is shown in U.S. Pat. No. 3,404,371, which is assigned to the assignee of the present invention. However, in recent years a demand has developed for a more streamlined housing in order to reduce the drag coefficient and increase the fuel efficiency of police vehicles.

The improved housing design disclosed in the above-mentioned U.S. Pat. No. 4,189,709 has significantly reduced drag in comparison with prior less streamlined housing shapes. However, we have discovered an air flow problem caused by the speaker grille which is customarily incorporated in the housing at the central portion thereof to accommodate a siren speaker mounted immediately behind the speaker grille.

In describing the air flow problem which the present invention eliminates, reference is made to FIGS. 4 and 5 which are schematic representations of air flow above and beneath a light/siren housing mounted across the roof of a vehicle. FIG. 4 shows a representation of a light housing 20, a vehicle roof 22, and brackets 24 securing the housing to the vehicle roof in spaced relation to the latter. FIG. 4 illustrates an air flow condition where the vehicle is moving from right to left, and thus the air is flowing to the right relative to the housing 20.

It will further be noted that the air splits into two paths when it reaches the front of the housing 20, a portion of the air flowing in an upper stream 26 above housing 20, and a second portion of the air flowing in a lower stream 28 which is beneath housing 20 and above the vehicle roof 22. The air flow schematically represented in FIG. 4 depicts a desired condition where high velocity air separates into two smooth laminar air streams around the housing of the light/siren assembly which is mounted across the roof of a police car or other emergency vehicle.

Figure 5A:
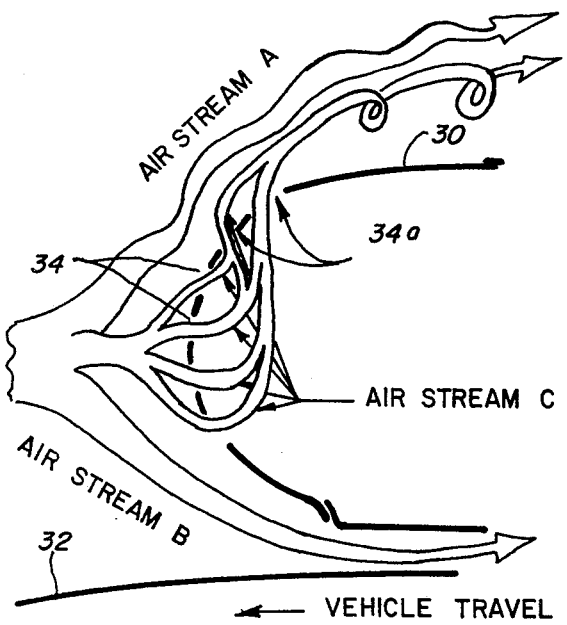
FIG. 5a is a schematic illustration of a partly turbulent air flow pattern which is representative of the air flow characteristics of several known streamlined light/siren housing designs.
Figure 5B:
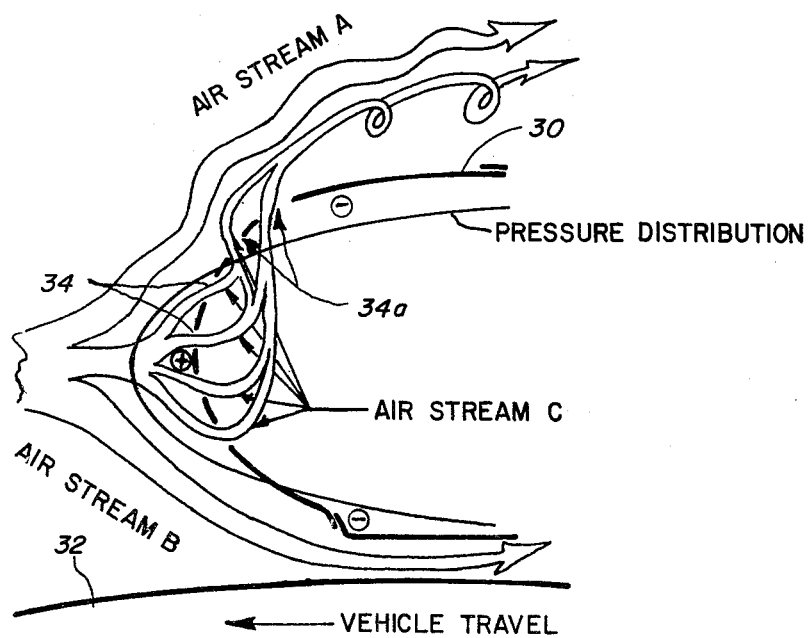
FIG. 5b is a view similar to FIG. 5a with a pressure distribution curve superimposed thereon.

Referring now to FIGS. 5a and 5b, FIG. 5a comprises a schematic representation of air flow above and beneath a light/siren assembly mounted across the roof of a vehicle, such representation being based on studies we have made with respect to a streamlined housing which is of the type shown in FIGS. 1-3 but has a conventional speaker grille with a plurality of small openings substantially filling a rectangular area, as disclosed more fully in the above-mentioned U.S. Pat. No. 4,189,709.

Figure 6:
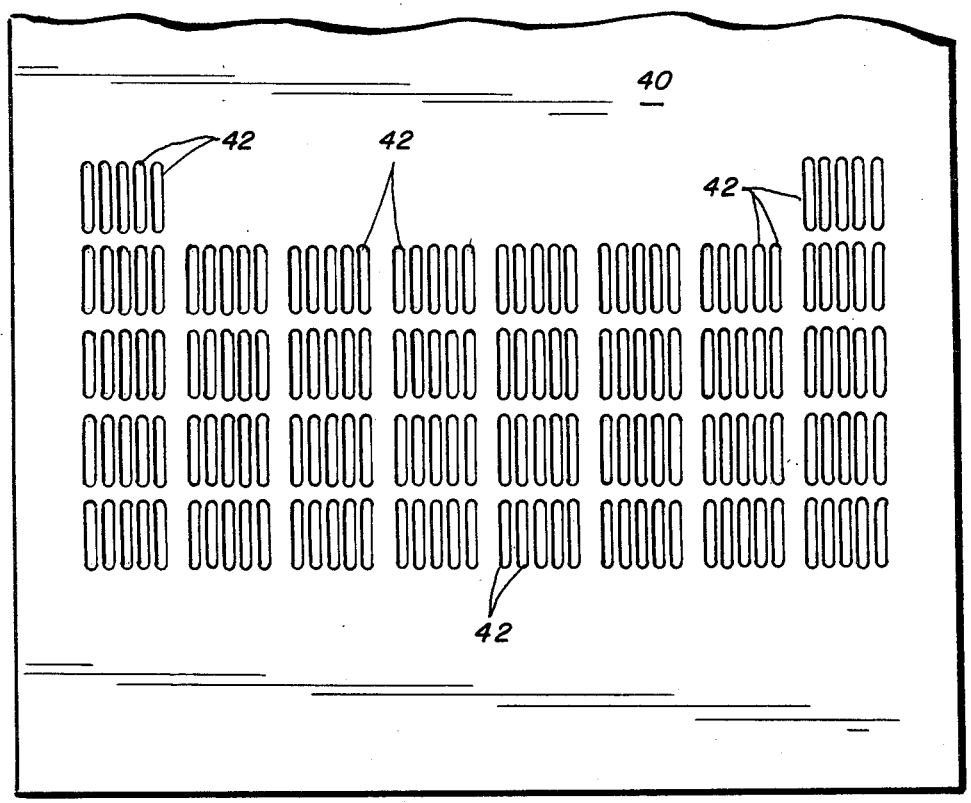
FIGS. 6 and 7 show different speaker grille plates constructed in accordance with the present invention, the plates being shown in flat condition prior to being formed into a desired streamlined shape.
Figure 7:
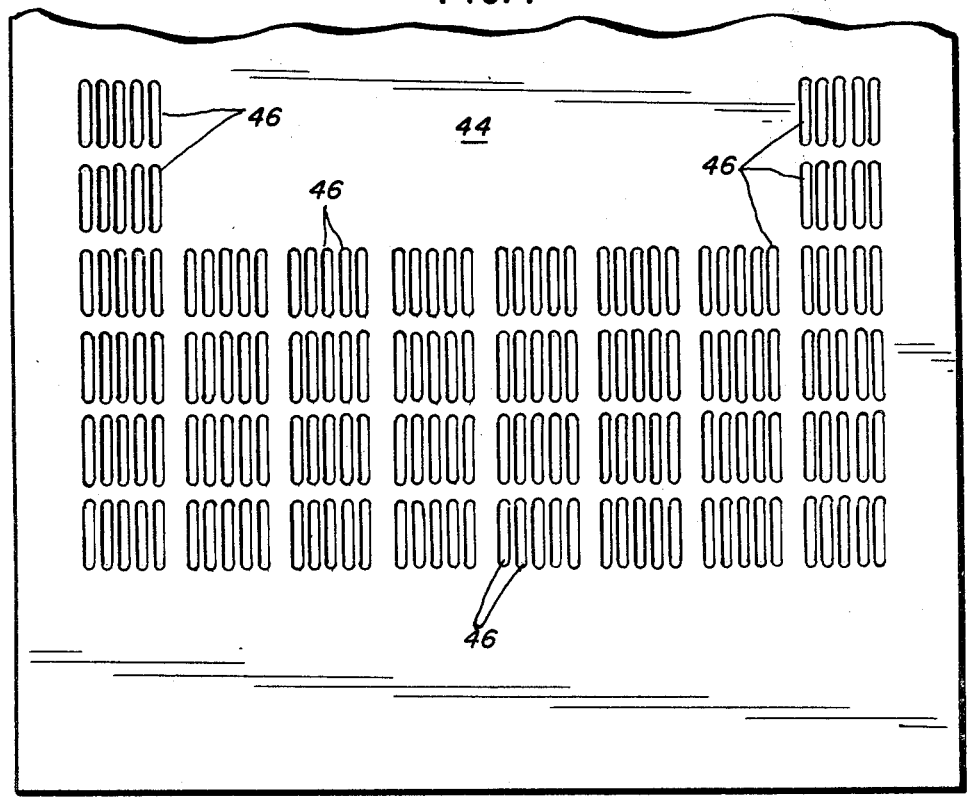

FIG. 5a schematically represents a light housing 30, a vehicle roof 32, and openings 34 which represent the openings in a speaker grille as shown at 18 in FIGS. 1-3 except openings 34 are in a known rectangular arrangement as would be the case in FIG. 6 if the top row of openings were complete, or in FIG. 7 if the top two rows of openings were complete. While housing mounting brackets are not illustrated, it will be understood such a housing is conventionally mounted in spaced relation to a vehicle roof as shown in FIG. 1.

It will be noted from FIG. 5a that one air stream A flows above housing 30, and a second air stream B flows below housing 30 between the housing and the vehicle roof 32. A third air stream C enters openings 34 at the front of the speaker grille and flows inside housing 30. In addition, as shown in FIG. 5a, air stream C then flows out of other openings 34a disposed higher up on the grille.

The foregoing phenomenon will be explained hereinafter, but it will here be noted that the entry of the third air stream C into the front openings 34 in the grille and then out the upper openings 34a in the vicinity of upper air stream A causes appreciable turbulence in the area above housing 30. Such turbulence increases the drag coefficient of the housing design, not because of the shape of the housing, but because of the effect of air stream C entering grille openings 34 at the front of the speaker grille and exiting from openings 34a higher up in the grille.

Reference is now made to FIG. 5b which will assist in explaining the above phenomena and which is the same as FIG. 5a except it has a pressure distribution curve applied thereto. The pressure distribution curve represents air pressure along the outer surface of housing 30, and a relative measurement of such pressure can be determined by drawing a vector perpendicular from the surface of the grille or housing 30 to the pressure distribution curve. The pressure curve represents pressure above and below atmospheric pressure, respectively.

As air stream C impinges against the front of the grille or housing 30, a high pressure above atmospheric pressure is created due to the drag effect of the leading surface of the housing. As a result, the pressure distribution curve illustrates the highest positive pressure, i.e., a pressure above atmospheric, at the front or nose portion of the housing.

As air stream A increases in velocity around the upper surface of housing 30, such increased velocity produces a reduced pressure, and it will be seen that the pressure distribution curve represents a negative pressure, i.e., a pressure below atmospheric pressure, along most of the upper surface of housing 30.

At the lower surface of housing 30, air stream B travels between housing 30 and vehicle roof 32 at a velocity sufficient to produce a negative pressure, i.e., a pressure below atmospheric pressure, along most of the underside of housing 30. However, because the proximity of vehicle roof 32 provides an obstacle which reduces the velocity of air stream B relative to air stream A, the pressure distribution curve shows a greater negative pressure at the top of the housing 30 as compared to the negative pressure at the bottom of the housing.

Consideration of the pressure distribution curve in FIG. 5b will assist in understanding the action of air stream C described above. Air stream C enters grille openings 34 at the front of the speaker grille because a high pressure develops in that area at the outside of the grille. However, because of the substantial negative pressure which exists along the outside of the upper surface of the grille, air stream C after flowing into the housing through openings 34 then flows out of the housing through openings 34a because there is a relatively low pressure, substantially below atmospheric pressure, immediately outside the housing in the area of the latter openings.

Because central air stream C is drawn out of the upper grille by the outside negative pressure, the air flowing out of openings 34a causes early separation of the laminar flow of the upper air stream A, so as to increase turbulence as represented schematically in FIG. 5b in the space between the top of housing 30 and air stream A. Our studies established the existence of turbulence in the foregoing area caused by the effect of the openings 34 and 34a in the speaker grille. We also established that elimination of openings in areas where negative pressures will occur significantly reduces the drag forces on the housing 30, without any change in the shape of such housing.

We have confirmed that elimination of all openings in the speaker grille 18 of a streamlined light/siren assembly as shown in FIG. 1 will significantly reduce the drag coefficient of such an assembly and thereby increase the fuel efficiency of a vehicle on which the light/siren assembly is mounted. However, it is not feasible to close all such openings, because it is necessary to preserve the acoustical characteristics of the speaker grille. We therefore conducted studies on possible relocation of certain of the openings in the speaker grille in an attempt to achieve maximum reduction of the drag coefficient without impairing in any significant way the sound emitting characteristics of the speaker grille.

The foregoing studies led to the development of speaker grilles of the type shown in FIGS. 6 and 7. FIG. 6 illustrates a speaker grille plate 40 having a plurality of elongated openings 42 formed therein. The grille plate 40 is illustrated in flat condition prior to forming it to a desired streamlined shape. Such a plate can be formed into a curved shape as shown in FIG. 1, but it will be understood there are many other known streamlined shapes which have low drag coefficients and can be used, the important feature of the present invention being the arrangement of the grille openings where at the upper portion of the grille certain conventional openings are closed in the central portion while being retained open at each of the outer side areas.

FIG. 6 shows that grille plate 40 has five horizontal rows of vertically elongated openings 42. However, only the four lower rows are complete rows of openings. The uppermost row has openings only at the left end portion and at the right end portion, but not in the center portion. In a similar manner, FIG. 7 shows a grille plate 44 having six horizontal rows of vertically elongated openings 46. In the latter case, only the lower four rows are complete, while each of the two uppermost rows have openings only at the left end portion and at the right end portion, but not in the center portion.

The grille designs shown in FIGS. 6 and 7 resulted from our discovery that the turbulence problem caused by conventional grille openings, as described above with reference to FIG. 5b, could be substantially eliminated by closing most of the openings in the upper area of the grille as shown as 34a in FIG. 5b, but leaving open the upper openings at the two ends or sides of the grille, resulting in a non-rectangular or stepped array of openings where the open area rises higher on each of the two sides than in the central portion of the grille. While such an arrangement was found to eliminate the turbulence problem, of equal importance is the fact that the closing of the upper central openings was found not to significantly impair the sound-emitting characteristics of the speaker grille.

We believe the highly satisfactory acoustical properties of speaker grilles of the type shown in FIGS. 6 and 7 can be explained by acoustic phasing. It is known that two acoustic radiators laterally spaced apart will radiate sound energy forwardly and rearwardly, i.e., in a direction generally transverse to a line between them, such that the acoustic wave fronts from both radiators will cause phase addition resulting in an enhanced sound pressure level, while some sound pressure level reduction will occur to the side areas. It is believed that the foregoing phenomenon explains why closing of the upper central openings in a speaker grille provided sound output characteristics substantially the same as grilles with the usual full rectangular array of openings.

The present invention is applicable to many different styles of streamlined light bars. In the preferred embodiment disclosed herein, the shape of the front portion of the light/siren housing including the speaker grille 18 as shown in FIG. 1 is generally oval. However, there are many other known streamlined designs comprised of a plurality of flat surfaces rather than a curved surface. By way of example, the forward portion of the housing can be generally V-shaped with the edge of the V pointed forwardly, and a plurality of other shapes comprised of curved or flat surfaces can be provided to afford a streamlined shape with relatively low drag characteristics. Such designs can benefit from the present invention if they include a speaker grille in the front of the housing.

It will be recognized that many variations can be made relative to the speaker grille designs shown in FIGS. 6 and 7. However, the success of these designs can be attributed primarily to two factors. First, several of the upper openings in a conventional rectangular array of openings have been closed. In other words, most openings such as shown at 34a in FIG. 5a have been closed to prevent air from being drawn out through such openings and causing turbulence. Secondly, by not closing entire rows of openings, but leaving at least a few of the upper openings intact at the two outer side areas of the speaker grille, an acoustic phasing effect can be accomplished with the result that sound characteristics are achieved which are close to those produced when a conventional full rectangular array of grille openings are utilized.

The present invention is applicable where the speaker openings extend into an area where due to the streamline shape of the housing, air flows at a relatively high velocity over the exterior of the housing. In any light bar incorporating a speaker grille in the front, air will tend to flow into the grille openings at the front portion where there is a relatively high pressure. However, the foregoing does not create a turbulence problem. Such a problem is created when the air inside the housing is drawn out of the speaker grille openings, as explained in connection with FIG. 5a and 5b.

Such air is drawn out of the grille openings only where there is a low pressure or negative pressure created in an area where grille openings are located. In certain previously known box-like designs, the grille openings are normally located only in the front upright wall of the housing where a high pressure is created, and thus air will only flow in and will not flow out such openings. The turbulence problem described herein is created where grille openings are present in a high velocity-low pressure area as normally occurs only with streamlined light bar designs.

It will now be understood that the foregoing objects of the invention have been accomplished by the design described herein. Not only does the speaker grille design of the present invention significantly reduce drag forces, but in spite of the closing down of many speaker grille openings, there is no impairment in the propagation of sound waves out of the speaker grille from a siren horn (not shown) mounted immediately behind the grille. As a result, fuel efficiency and maximum speed of police and other emergency vehicles is increased without impairing ability of the siren system to perform its warning function.

In the foregoing description, emphasis has been placed on the upper portion of the speaker grille for the reason that (1) a high velocity air stream develops above the speaker grille which creates a low pressure area, and (2) grille openings are normally provided in the low pressure area to emit sound waves, and it was not previously recognized that air will exit through such openings and cause turbulence. On the other hand, we did not refer to a similar situation at the lower portion of the speaker grille because the pressure is not as low in that area and it is not common to provide openings at the underside of the grille. For example, FIG. 5b shows a known type of speaker grille, and the pressure distribution curve shows there is a low pressure area at the underside of the grille. However, the openings 34 in the grille are not located in the low pressure area at the underside of the grille, and thus there will be no air exiting from the grille to disrupt the lower air stream B.

Despite the foregoing, it should be understood the present invention can have application to the lower portion of a speaker grille in addition to the upper portion. For example, if one elected to raise the height of the light/siren assembly relative to the vehicle roof (to a greater height than illustrated in the drawings), such elevation of the assembly would diminish the effect of the roof in reducing the velocity of air stream C shown in FIG. 5b. The result of the foregoing would be a higher velocity air stream B flowing beneath the housing assembly, with a consequent reduction in air pressure.

In other words, as the housing 20 is elevated relative to vehicle roof 32, air pressure beneath the housing tends to be as low as air pressure above the housing. In addition, with a more elevated light/siren housing, it might be desirable to add speaker openings at a lower height than shown in FIGS. 5a and 5b. Accordingly, by a modification of the assembly, the present invention may be applicable to the underside of the speaker grille to the same extent as described herein relative to the upper portion of the speaker grille.

What is claimed is:

1. In a combination light/siren assembly of a type to be mounted across the roof of an emergency vehicle and having an elongated housing which extends across the vehicle roof in spaced relation thereto, including warning lights mounted in said housing, and a siren speaker located in said housing, the improvement comprising, a speaker grille incorporated into said housing forwardly of said siren speaker and formed with a leading portion which divides oncoming air into separate streams which flow above and below said grille, said speaker grille having a plurality of small openings formed therein for emitting sound waves from said siren speaker, said openings being provided in a non-linear profile in an upper portion of said speaker grille so as to extend to a greater height in two laterally spaced outer side areas and to a lesser height in a central area of said speaker grille, whereby air entering said housing through openings in the front of said grille will be substantially restricted from exiting upwardly into the air stream flowing above said housing, and the acoustical characteristics of said speaker grille will be enhanced by the higher level of openings at said two laterally spaced upper side areas of said grille.

2. An improved speaker grille as defined in claim 1 where said central area where said openings extend to a lesser height is wider than the combined width of said two laterally spaced outer side areas where said openings extend to a greater height.

3. An improved speaker grille as defined in claim 1 where said non-linear profile constitutes a generally linear approximately horizontal lower level of openings in said central area and a generally linear approximately horizontal higher level of openings in each of said two laterally spaced outer side areas.

4. An improved speaker grille as defined in claim 1 where said openings are provided in a plurality of generally horizontal rows, and where at least the uppermost horizontal row of openings has a closed central area with openings provided only in two laterally spaced outer side areas of said row.

5. An improved speaker grille as defined in claim 4 where approximately three-fourths of the width of at least said uppermost row of openings comprises a closed central portion and approximately one-fourth of the width of said uppermost row of openings comprises said two laterally spaced outer side areas where the openings are located.

6. An improved speaker grille as defined in claim 1 where said speaker grille is formed with a curved leading edge portion having an approximately oval shape.

7. An improved speaker grille as defined in claim 1 where said greater height to which the grille openings extend in the two laterally spaced outer side areas is located where the air pressure immediately outside said housing when said vehicle is traveling forwardly is less than atmospheric pressure due to the velocity of air flowing over the top of said grille, whereby said central area of said speaker grille is closed where outside pressure is below atmospheric pressure.

8. In a combination light/siren assembly of a type to be mounted across the roof of an emergency vehicle and having an elongated housing which extends across the vehicle roof in spaced relation thereto, including warning lights mounted in said housing, and a siren speaker located in said housing, the improvement comprising, a streamlined speaker grille incorporated into said housing forwardly of said siren speaker and formed with a leading portion which divides oncoming air into separate streams which flow above and below said grille including a relatively high velocity air stream flowing above said grille creating a lower pressure area with pressure below atmospheric pressure immediately above said grille, said speaker grille having a plurality of small openings formed therein for emitting sound waves from said siren speaker, said openings being located below said low pressure area so that said speaker grille is substantially closed in said low pressure area at least in the middle half of said speaker grille, whereby air entering said housing through openings in the front of said grille will be substantially restricted from exiting upwardly into the high velocity air stream flowing above said grille.

* * * * *